United States Patent
Lussier (10) Patent No.: US 9,817,942 B2
(45) Date of Patent: Nov. 14, 2017

(54) SYSTEM FOR CREATING UNIVERSAL MATING CABLES AND RELATED TESTING PROGRAM

(71) Applicant: Ziota Technology Inc., St-Hubert (CA)

(72) Inventor: Alain Lussier, Ogden (CA)

(*) Notice: Subject to any disclaimer, the term of this patent is extended or adjusted under 35 U.S.C. 154(b) by 527 days.

(21) Appl. No.: 14/230,955

(22) Filed: Mar. 31, 2014

(65) Prior Publication Data
US 2014/0290049 A1   Oct. 2, 2014

Related U.S. Application Data (60) Provisional application No. 61/806,899, filed on Mar. 31, 2013.

(51) Int. Cl.
G06F 17/50 (2006.01)
G01R 1/04 (2006.01)
G01R 31/28 (2006.01)

(52) U.S. Cl.
CPC ....... G06F 17/5086 (2013.01); G01R 1/0416 (2013.01); G01R 31/2834 (2013.01); G06F 2217/36 (2013.01); Y10T 29/49117 (2015.01); Y10T 29/532 (2015.01)

(58) Field of Classification Search
CPC  G01R 1/0416; G01R 31/2834; G01R 31/026; G06F 17/5086; G06F 2217/36; Y10T 29/532; Y10T 29/49117; Y10T 29/49204
USPC ..... 29/825, 874–876; 264/113, 128; 324/66, 324/539; 374/2; 419/5; 902/22; 439/276
See application file for complete search history.

(56) References Cited

U.S. PATENT DOCUMENTS

| 5,204,055 A * | 4/1993 | Sachs ..................... B05C 19/04 264/113 |
| 5,280,251 A * | 1/1994 | Strangio ............. G01R 31/026 324/539 |
| 5,845,234 A | 12/1998 | Testa et al. |
| 5,999,596 A * | 12/1999 | Walker ................... G06Q 20/04 902/22 |
| 6,128,759 A | 10/2000 | Hansen |
| 6,960,102 B2 * | 11/2005 | Styles .................. H01R 13/514 439/276 |
| 7,376,876 B2 | 5/2008 | Raul et al. |

FOREIGN PATENT DOCUMENTS

WO   WO 2012083420 A   6/2012

* cited by examiner

*Primary Examiner* — Donghai D Nguyen
(74) *Attorney, Agent, or Firm* — Benoit & Cote, Inc.; C. Marc Benoit (57) ABSTRACT

The present document describes a method for building a part for use with a test equipment in the performance of a test of electrical equipment. The part comprises at least one of a connector, an interface cable, and a test program. The method comprises accessing a database comprising data about the part, building the part based on the data, and providing the part with a unique identifier. The data is sufficient for at least one of determining an availability of the part and allowing building the part.

15 Claims, 11 Drawing Sheets

SYSTEM FOR CREATING UNIVERSAL MATING CABLES AND RELATED TESTING PROGRAM

CROSS-REFERENCE TO RELATED APPLICATIONS

This application claims priority of U.S. provisional patent application 61/806,899 filed Mar. 31, 2013, the specification of which is hereby incorporated herein by reference in its entirety.

BACKGROUND (a) Field

The subject matter disclosed generally relates to automated testing equipment for electrical equipment.

(b) Related Prior Art

Electrical tests and maintenance of electrical equipment are performed using portable handheld testers such as multimeters and automated test equipment (ATE) such as wiring analyzers and other bench testers to perform validation of integrity or functional tests.

One of the main drivers for the type of equipment to use is the availability of interface cables to connect to the various connection points of the subject under test (SUT) on a timely basis with the nature of the test or maintenance to be performed. The limitations in the performance of existing handheld testers and ATEs are mostly related to the ability of a technician to use them efficiently to deliver or return to service the SUT. The handheld testers are generally very agile as they can be used on any connection point using generic probes on specific connections, but are limited in the scope of work that can be performed by a technician who is testing only a few test points at a time. The ATEs are more efficient for their ability to carry a series of test programs on a large number of test points, but they require a large number of customized interface cables to interconnect to the SUT.

The level of agility of existing testers is dependent upon the following factors:

Scope of Test/Maintenance:
Diversity of connector models used on equipment SUT;
Diversity of test procedures and signals required for the test of maintenance;
Number of interconnection points to be tested at the same time;
Planning of Test/Maintenance:
Many weeks are generally available to plan the construction of interface cables and test programs for an activity of quality control testing of a production or recurring maintenance;
Maintenance of unexpected electrical failures requires immediate action to carry on all test procedures as soon as possible to return the SUT to service; time is of the essence and planning is inexistent to provide the technician with all the interface cables at the location of the SUT unless they were effectively built in advance and stored at this particular location;
Financial considerations are always an important consideration to determine if the interface cables should be built in advance in anticipation of a maintenance/failure activity:
Engineering costs to create and to design an interface cable layout between the ATE and SUT;
Costs to build the interface cable;
Programming costs to integrate the interface cable into the ATE library of tests;
Programming costs to create the test program;

Opportunity costs of the operator of the SUT to wait for the interface cable to be able to use the ATE to make urgent repairs. Considering all these factors, there is a need to have a flexible method to design, build and deploy to the location of the SUT all of the interface cables and the test program required for a technician to use an ATE to carry on the full scope of test/maintenance to return the SUT to service, and avoid costs associated with delays and erroneous troubleshooting due to limited test equipment availability.

SUMMARY

Present Mode of Operation is an ATE with construction-oriented interface cables and test programs. Consequently, the ATE described herein is based on universal connector database for GUI-oriented mates and test programs that will be serialized to track usage and functions.

According to an embodiment, there is provided a method to create universal mating interface cables and test programs rapidly using a centralized database containing the library of all types and models of connectors that can then be used graphically to create test programs, and with the ability to be remotely operated to create, validate and track all the mating interfaces and test programs required for immediate assistance at any location in the world.

In an aspect of the invention, there is provided a method for building a part for use with a test equipment in the performance of a test of electrical equipment, the part comprising at least one of a connector, an interface cable, and a test program, the method comprising: accessing a database comprising data about the part, the data being sufficient for at least one of determining an availability of the part and allowing building the part; building the part based on the data; and providing the part with a unique identifier.

According to an embodiment, the method further comprises, prior to accessing a database, identifying all parts that are required for the performance of the test.

According to an embodiment, the method further comprises identifying all parts that are not available for the testing of electrical equipment.

According to an embodiment, the method further comprises, with the unique identifier, validating the identity of the part as usable in a regulated context.

According to an embodiment, accessing a database comprises accessing, through a communication network, a centralized database which is remote from a location at which the testing is performed.

According to an embodiment, accessing a database comprises performing a financial transaction to permit access to the data allowing building the part.

According to an embodiment, building a part based on the data comprises building a connector shell using a 3D printer.

According to an embodiment, building a part based on the data comprises building a connector using a printed circuit board and standard contacts.

According to an embodiment, building a part based on the data comprises obtaining existing parts and assembling them into an interface cable.

According to an embodiment, the method further comprises, prior to building a part, accessing an inventory management module for informing a user about the availability, at a given location, of the existing parts for an interface cable.

According to an embodiment, building a part using the data comprises generating a test program in accordance with an actual configuration of the testing equipment.

According to an embodiment, generating a test program comprises generating a test program based on a graphical representation of the test equipment.

According to an embodiment, the method further comprises saving the unique identifier in the database for a future use.

In another aspect of the invention, there is provided a system for building a part for use with a test equipment, the system comprising: an inventory management module for informing about the availability, at a given location, of the part; a library comprising data about the part, the data being sufficient for allowing a building thereof; and a communication infrastructure for communicating the data about the part to a location at which the testing is performed for allowing the building of the part.

According to an embodiment, the system further comprises a graphical user interface (GUI) to allow a user to access the library and the inventory management module.

According to an embodiment, the communication infrastructure is further for sharing information between the GUI, the library and the inventory management module.

According to an embodiment, the library and the inventory management module are comprised in a centralized database which is remote from a location at which the testing is performed.

According to an embodiment, the communication infrastructure is for communicating information between the centralized database and the location at which the testing is performed.

According to an embodiment, the system further comprises an assembly kit which comprises a printed circuit board and subparts for building the part of test equipment.

According to an embodiment, the system further comprises a 3D printer for building the part of test equipment at least in part.

According to an embodiment, the library comprising data about connectors comprises at least one of: connector layout, drilling positions, connector dimensions, types and models of contacts, types and models of shells.

According to an embodiment, the system further comprises a computer for building a test program for running the test equipment.

As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description of selected embodiments, taken in combination with the appended drawings, in which.

It will be noted that throughout the appended drawings, like features are identified by like reference numerals.

DETAILED DESCRIPTION

When, at the beginning of or during a testing of electrical equipment, it is noted that a part of test equipment is missing or incomplete, there is a need to fulfill this need promptly. There is described a method for finding the missing part at a nearby location, using a system 1 comprising an inventory management module 12 accessible through a communication network 20, and/or for building the missing part of testing equipment using the data necessary for its manufacture. Such data can be found in a specialized library 11 which is accessible through the communication network 20. The library 11 and the inventory management module 12 can be embedded in a remote centralized database, which ensures common knowledge among the various subscribers, and helps serializing and validating the parts that are built using the method presently described to make sure that the test equipment was made and is used by approved entities. According to embodiment, users can use the method through a GUI 12 (e.g. a website, a software application and the like).

When a given part of testing equipment is missing, instead of waiting for days of weeks to receive it (and pay the high price), it is possible to find the missing part if it is located nearby, to find the constitutive pieces that can be assembled into the part that is missing, or to build the part completely using data about the materials, dimensions and configuration. In-situ building of parts can be performed in various ways, such as assembling of available fundamental parts or subparts by a working crew, and/or manufacturing it at the test location using customized manufacturing means such as a 3D printer.

The terms "part of testing equipment" is to be understood as comprising both physical parts, such as interface cables and specific connectors (both connectors that mate with the subject under test or with the automated test equipment), and virtual parts, such as test programs that may be needed to run a given test. Just like physical parts, test programs can be missing, and they need to be generated and validated prior to using them for testing a harness.

According to an embodiment, the electrical equipment to be tested comprises wire harnesses or other types of cables having interconnections between them.

Figure 1:
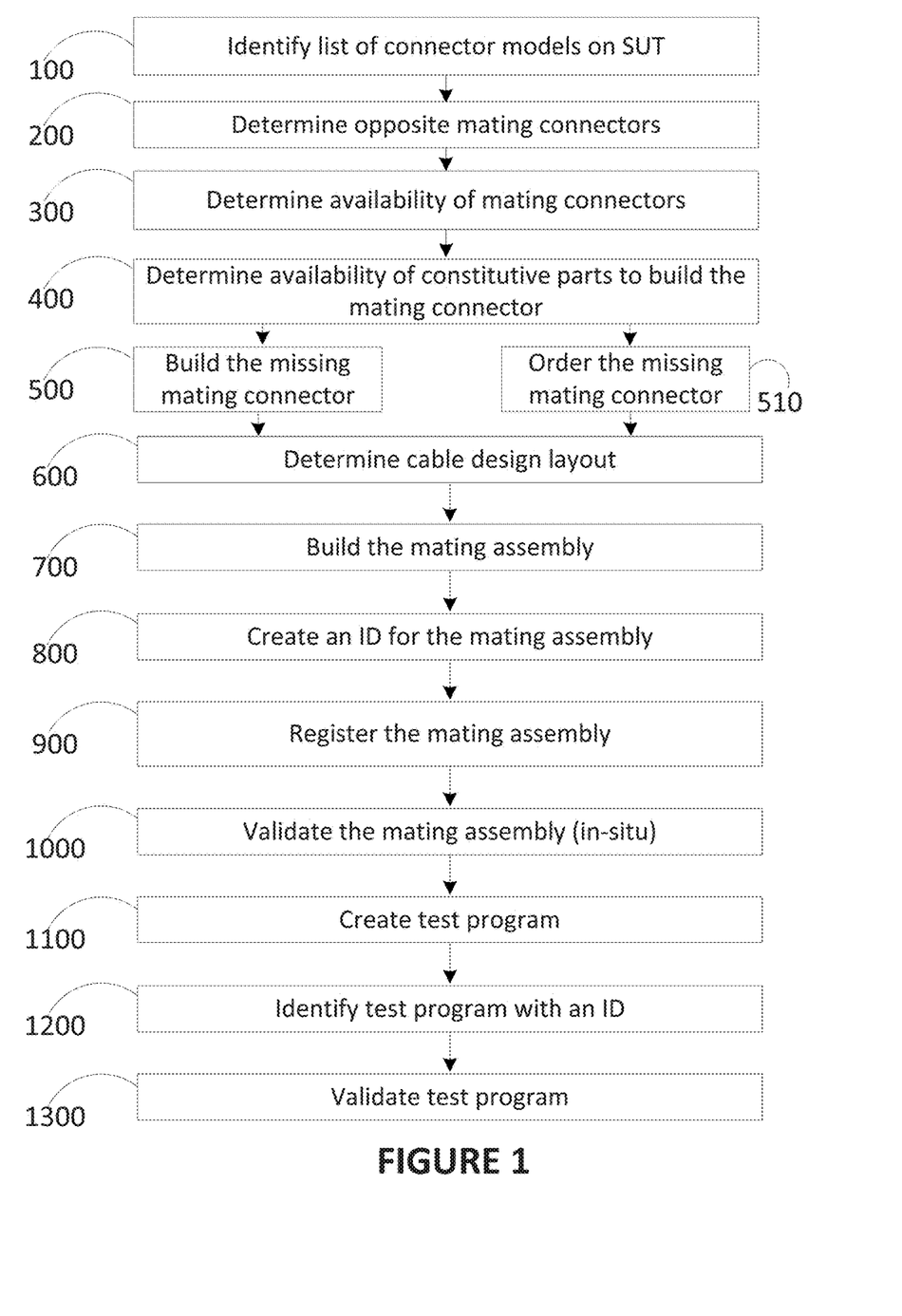
FIG. 1 is a flowchart of a method for creating universal mating cables and related testing programs, according to an embodiment.

As shown in FIG. 1, the steps to build interface cables are as follows:

Identify list of connector models on the SUT (step 100);

For each connector identified in step 100, determine the opposite mating connector (step 200);

Determine if the mating connector in step 200 is available on an existing interface cable in the inventory (step 300);

If none are found in step 300, determine if the parts to build such an interface connector are available (step 400). Generally, planning can be made in advance for the virgin interface cable that includes the ATE standard mating connector and sufficient wire to connect to the SUT mating connectors. The present description relates to the mating connector parts such as connector main shell, contacts and backshell;

If the parts in step 400 do not exist, there will be a need to rapidly:
  a. Order the parts required (step 510) and proceed to step 600 once available; this will inevitably involve delays in terms of days or weeks;
  b. To reduce delays, build the required mating connector (step 500) with a process that uses standard contacts that can be inserted into either:
    i. a pre-build templates representation of the mating connector such as printed circuit boards; or
    ii. a database-based program to manufacture the connector using a 3-D printer or other rapid method;
    iii. a combination of manufacturing means (e.g. 3D printer) for building missing subparts (such as connectors shells or other non-metallic subparts) and electric assembling kit (for assembling the standard contacts with the newly built connector shells, for example).

Determine the required mating interface cable design layout (step 600) that will link each of the connection points on the ATE standard connector identified in step 400 with a specific mating wire to the appropriate connection point on the mating connector, either by:
  a. An engineering drawing determining such design;
  b. A standard database identifying the layout of such design;

Physically build the mating assembly consisting of the ATE mate connector, wires and opposite mating connector (step 700);

Create an identification for the mating assembly (step 800) so that it can be recognized by an ATE by any or a combination of the following methods:
  a. A standard number for the mating assembly;
  b. A unique serial number to the mating assembly;
  c. Incorporating a medium to read the information about the mating assembly;
    This identification method can be performed manually or it can be created using a database Except if incorporating a medium was performed, the final mating assembly must be registered (step 900) so that it can be recognized by the ATE for it to be able to use it on the SUT. This can be performed manually or can be created by a software in various ways, including:
  a. Adding the mating assembly to the ATE library the design layout of the mating assembly;
  b. Adding the mating assembly to a standard database;

Once recognizable by the ATE as described in step 900, the mating assembly can be shipped to the location where it is needed by the technician for the test/maintenance on the SUT, and at that point, it will generally need to be validated (step 1000) prior to the first utilization to make sure that it respects the specifications of connector on the SUT and that it was made by an approved vendor;

Another step generally required to operate the ATE is creating a test program (step 1100) that incorporates one or many interface mating cables and requires engineering or technician skills to ensure that the test signals sent to the SUT are appropriately sequenced on the specific connections points of any or all of the connectors. Such programs are generally done by any of:
  a. The organization responsible for the test/maintenance;
  b. The ATE manufacturer;
  c. Approved vendors;

The test program must also be identified (step 1200) in a matter similar to step 800;

The test program must also be delivered to the location of the test/maintenance and validated (step 1300) prior to its first utilization to ensure that it respects the specifications of the test requirements and that it was made by an approve entity listed in step 1100.

Figure 2:
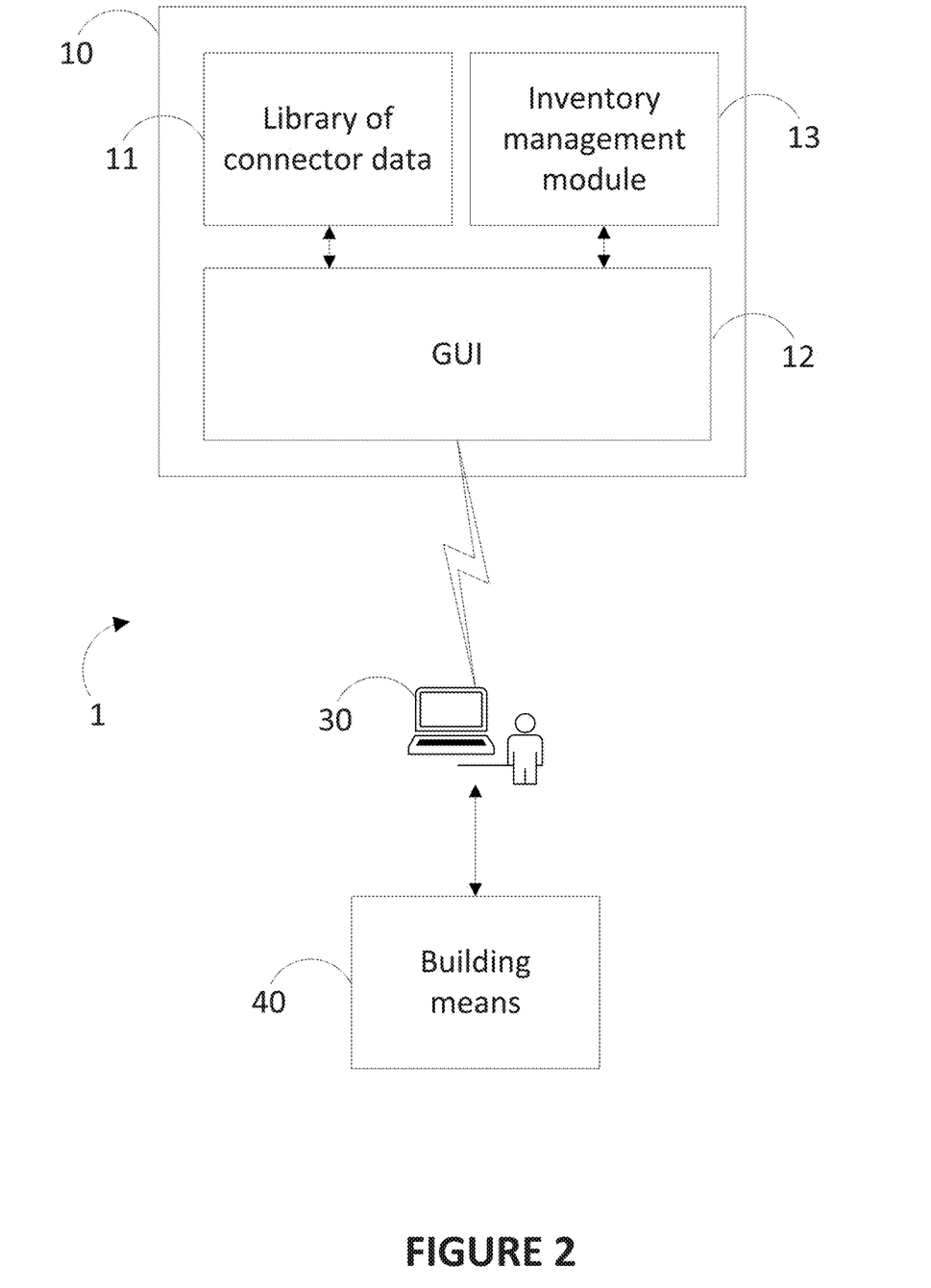
FIG. 2 is a block diagram showing the system for creating universal mating cables and related testing programs, according to an embodiment.

According to an embodiment, in order to perform the above-noted steps in the most productive way, the novel system 1, which allows many of these steps to be performed programmatically at least in part, consists in the following: a centralized database 10, a library 11, an inventory management module 13, and a communication infrastructure 20, as illustrated in FIG. 2.

The centralized database 10 that has the ability to create, support, validate and track any of:
  Library 11 of all types and models of connectors and their subparts, with details as to
    Physical layout and dimensions to support mechanical reproduction such as 3D printers or printed circuit boards, including drill out positions for the insert contacts;
    Graphical layout of contact positioning and numbering/lettering;
    Family type and opposite mating connectors;
    Types and models of contacts;
    Types and models of backshell;
    Any other information as required;
  Graphical tools 12 to support the production of an interface cable, with details as to:
    Type and model of connector to connect on the ATE side;
    Type, number, layout position, length, number and other details of the wires required to interconnect the connectors;
    Type and model of connector to connect on the SUT side;
    Tools and related adjustments required to build the cable interface;
    Identification of the interface cable by a serial number, model number, and other relevant information as to its specifications or its use.
  Inventory management module 13 to determine availability at any location of:
    Mating interface cable by serial number or model number;
    Connectors by type and model number, whether for the ATE or SUT side;
    ATE test equipment by serial number or model number;
    Test programs by serial number or functional procedure, both in relation to ATE equipment and interface equipment that will be used together;
    Any parts required to build interface cables assemblies, including raw materials and parts to build the connectors and/or the wiring parts of the cables;

A communication infrastructure 20 to support internationally in real-time the operations that will be required to exchange the information between the central database 10 and the location at which the part for testing are needed for the test to be performed, thereby allowing the system 1 to:

Find, within an inventory, existing interface cables, test programs, ATE equipment or parts as described previously;

Create an interface cable or a test program and provide it with a unique identification number;

Validate the configuration and identity of a cable interface and/or test program;

Support any other technical function in relation to interface cables or test programs or other accessories in relation to electrical testing;

Support any administrative and financial operations in relation to the cable interface or test programs, including services such as rental, pay-by-use, license fee or other type of services.

The user can access the system 1 through a computer 30 which is connected with the communication infrastructure 20. Such communication infrastructure 20 can be of any form, including network or cloud computing. If parts of test equipment are to be built, building means 40, such as 3D printer, electronic kit (printed circuit board and electronic basic parts and contacts) and the like. If the part to be built is a test program, the building means 40 is rather a computing device performing specific instructions to create a test program. These instructions can be performed on the in-situ computer 30, or on another computer accessed through the communication infrastructure 20. According to an embodiment, generating the test program is made through the GUI 12. For example, the user can specify, using a graphical representation of the connector layout, which links in the harness have to be tested.

According to an embodiment, the system 1, since it is implemented on a computer, can programmatically perform many steps at least in part, or it may simply assist a user in performing these tasks much more efficiently, especially for steps 100 to 400, 600, and 800 to 1300. Some of these tasks involved delays in the prior art, and the delays are considerable reduced by the combined use of the database 10, graphical tools 12, inventory management module 13 and communication infrastructure 20. The system 1 further allows performing step 500, namely build a connector with a 3D printer, and consequently, step 700 (building the connector assembly).

Serialization (i.e. attributing an ID to the parts that were built, including the test programs) eases remote validation of the newly built parts test equipment. The serial number/ID of the parts or assemblies can be compared to the data in the central database (through the communication network 20). Registration/validation is therefore accelerated by the present system 1.

According to an embodiment, it is possible to perform a financial transaction to obtain the data to build the part.

According to an embodiment, the database contains the ID of parts in various locations. The database 10 thus knows the identity of the parts that can be used for performing a test, which can be useful in regulated contexts in which regulations, legal requirements, best practices or standards are applied, such as in the aircraft maintenance industry. If the parts are detected during the test, the database can be aware of unidentified parts or parts with a falsified ID, therefore identifying counterfeit or stolen parts, an issue which is critical in the industry of aircraft maintenance. It is why an ID which is created using the method presently described is saved in the database so the database knows the existence of the newly built part, knows its ID and knows it is a legitimate part.

Figure 3:
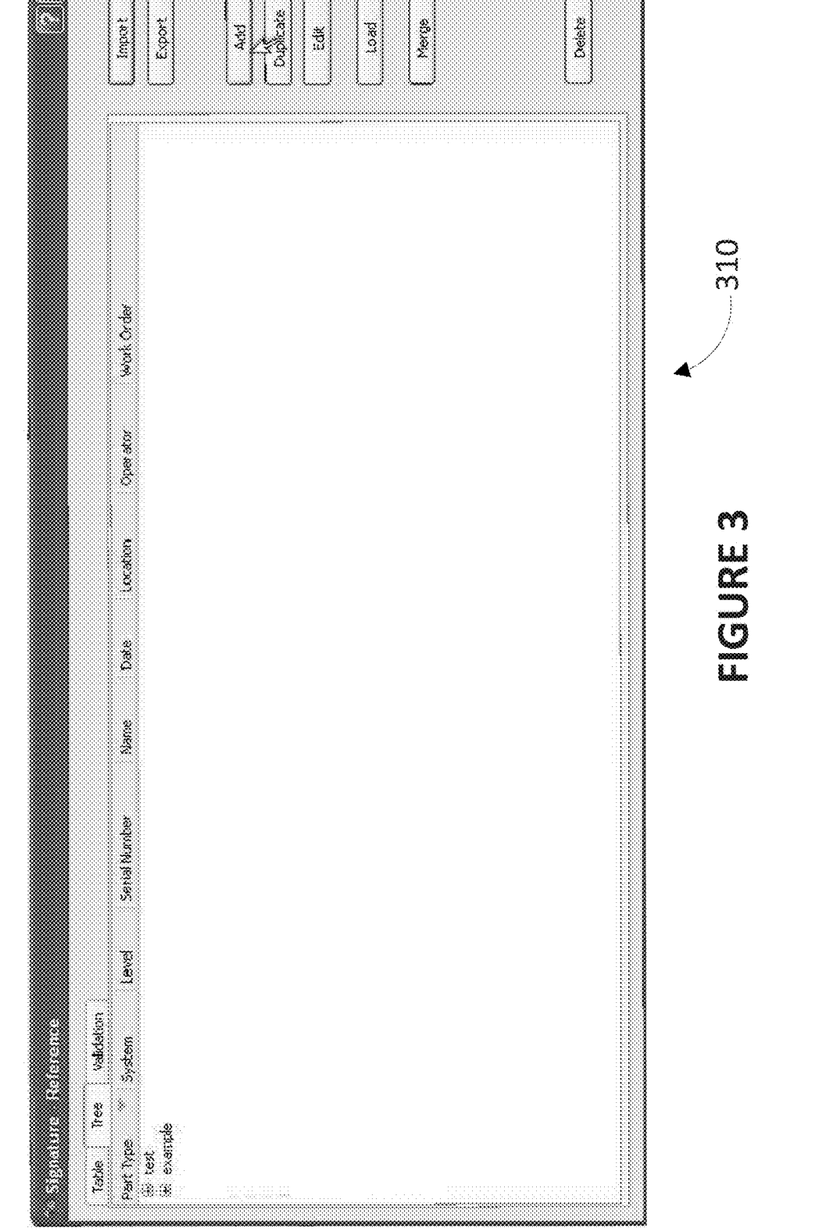
FIG. 3 is a screenshot illustrating a test management panel, according to an embodiment.
Figure 4:
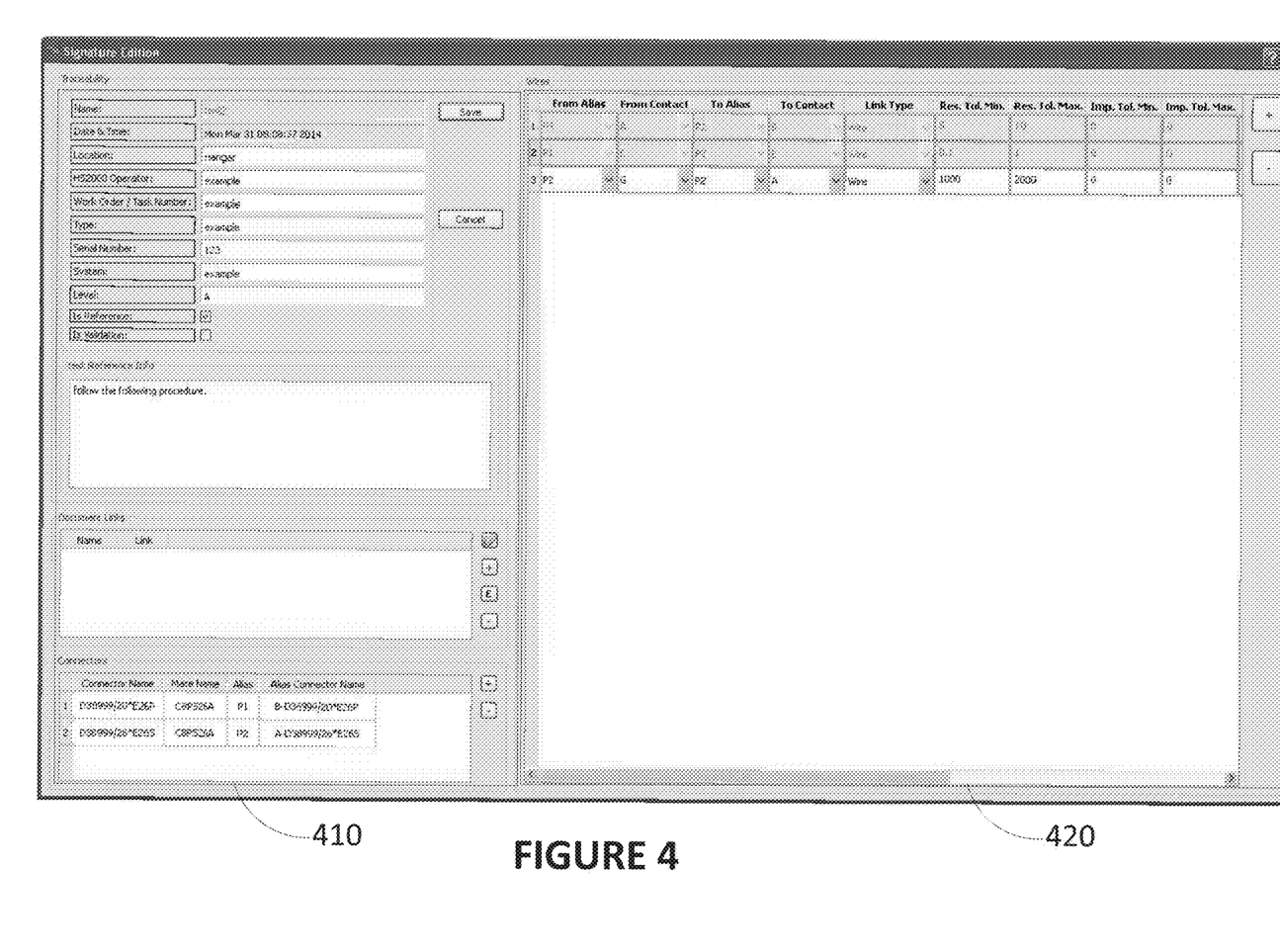
FIG. 4 is a screenshot illustrating an interconnection panel in which a user can define the links to be tested, according to an embodiment.

Now referring to FIGS. 3 and 4, there is shown an interconnection panel 420 in which the user can define the interconnections or links to be tested in a test program, thereby creating a test program. In the example shown in FIG. 4, the links P1-A to P2-B, P1-E to P2-E and P2-G to P2-A are defined so that they will be tested. A specification panel 410 allows the user to specify details (date, operator, name of the test, serial number, location, etc.) about the test to be performed. Supplemental information can be provided and the details of the test can be saved. FIG. 3 shows a test management panel 310 in which tests programs can be imported or exported, added or deleted, merged, duplicated and edited.

Figure 5:
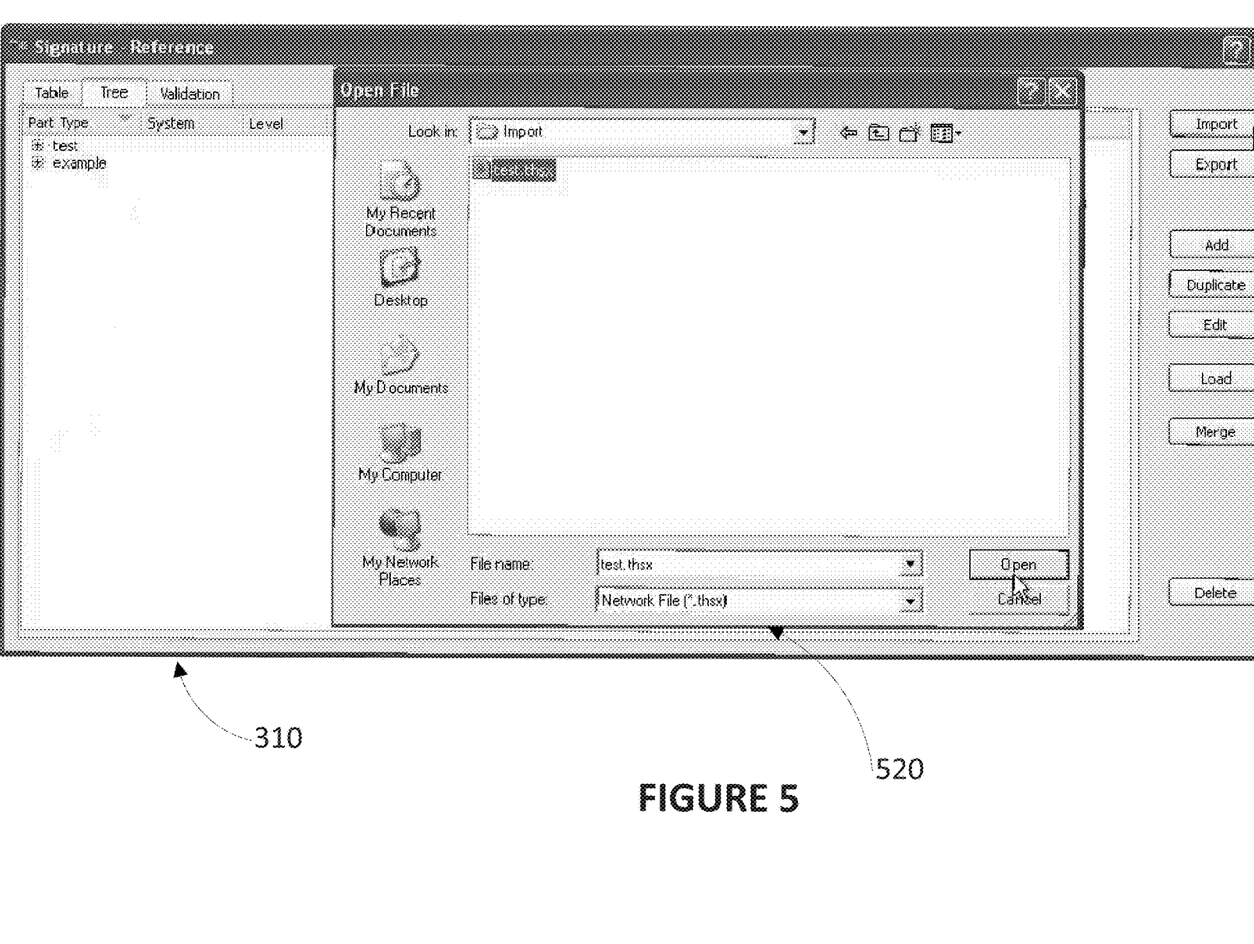
FIG. 5 is a screenshot illustrating a test management panel through which an importation panel is called, according to an embodiment.

FIG. 5 shows the test management panel 310 through which an importation panel 520 was called, thereby allowing importing a specific file which contains test program instructions.

Figure 6:
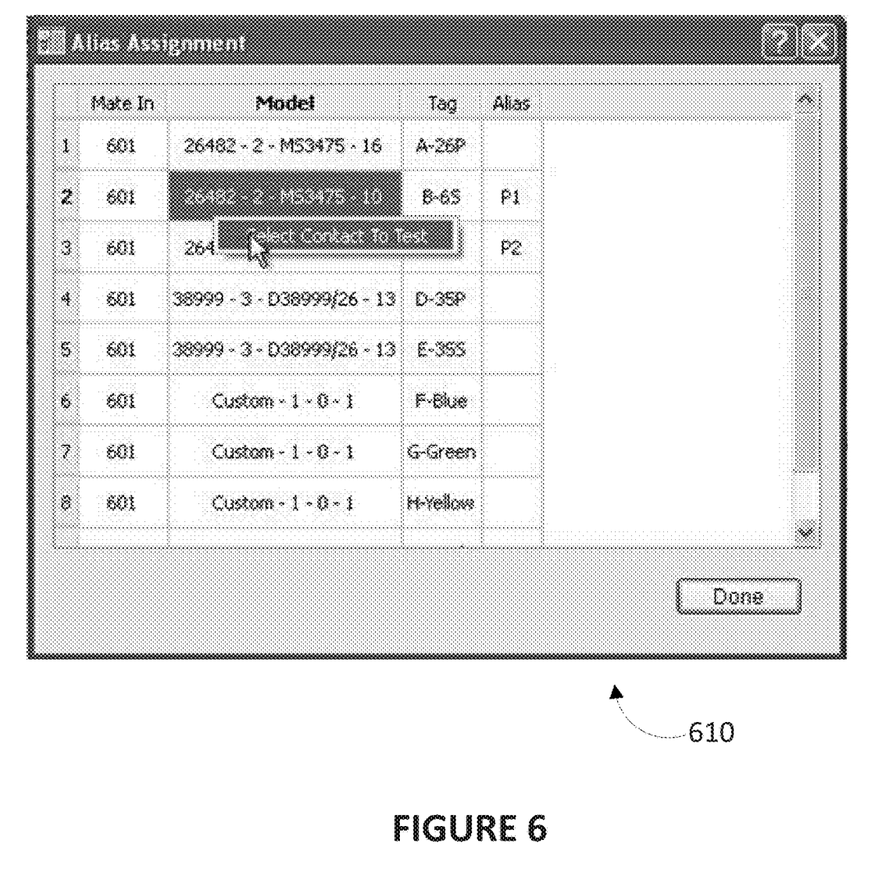
FIG. 6 is a screenshot illustrating a selection panel in which a connector can be selected, according to an embodiment.
Figure 7:
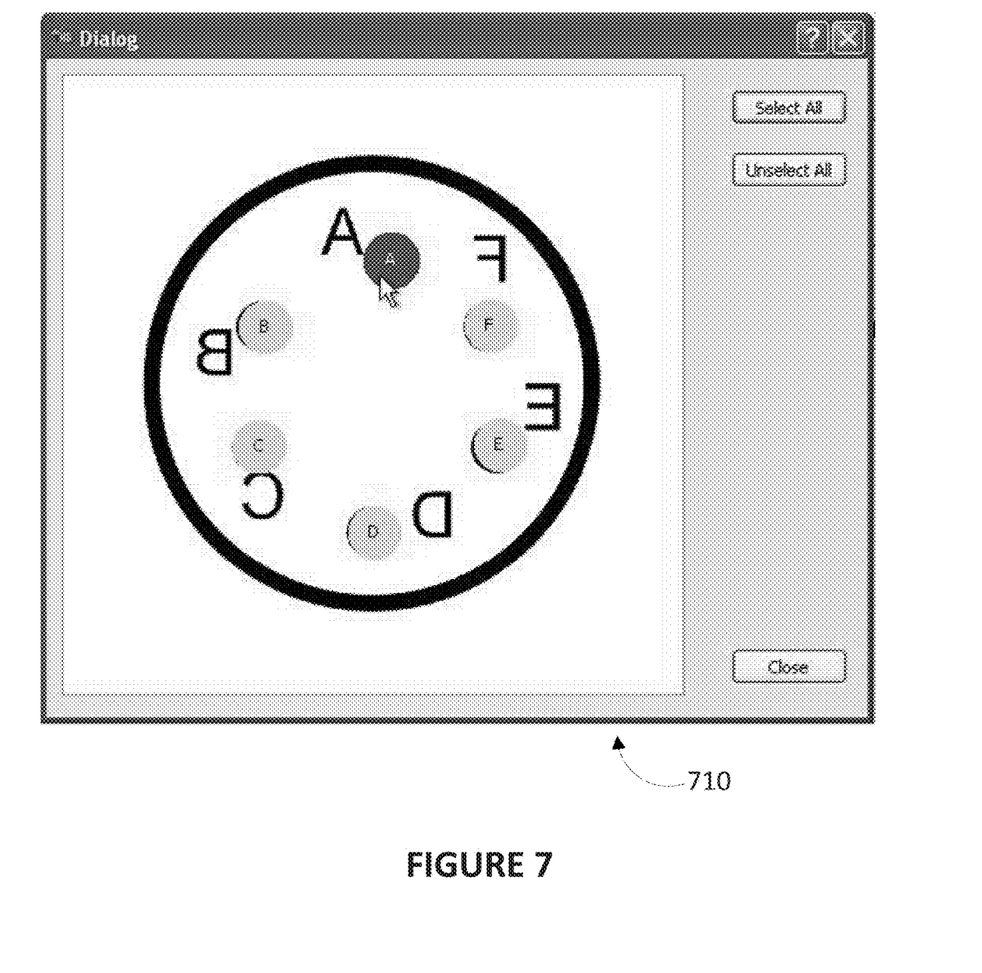
FIG. 7 is a screenshot illustrating a graphical interface for selecting contacts to be tested for the performance of a test, according to an embodiment.

Now referring to FIGS. 6 and 7, there is shown a graphical interface for selecting contacts to be tested for the performance of a test. FIG. 6 shows a selection panel 610 in which a connector can be selected. When a connector is selected, a graphical representation of the connector can be displayed, as in the connector display 710 shown in FIG. 7. The connector display 710 allows the user to select or unselect one or many contacts to be tested in the connector.

Figure 8:
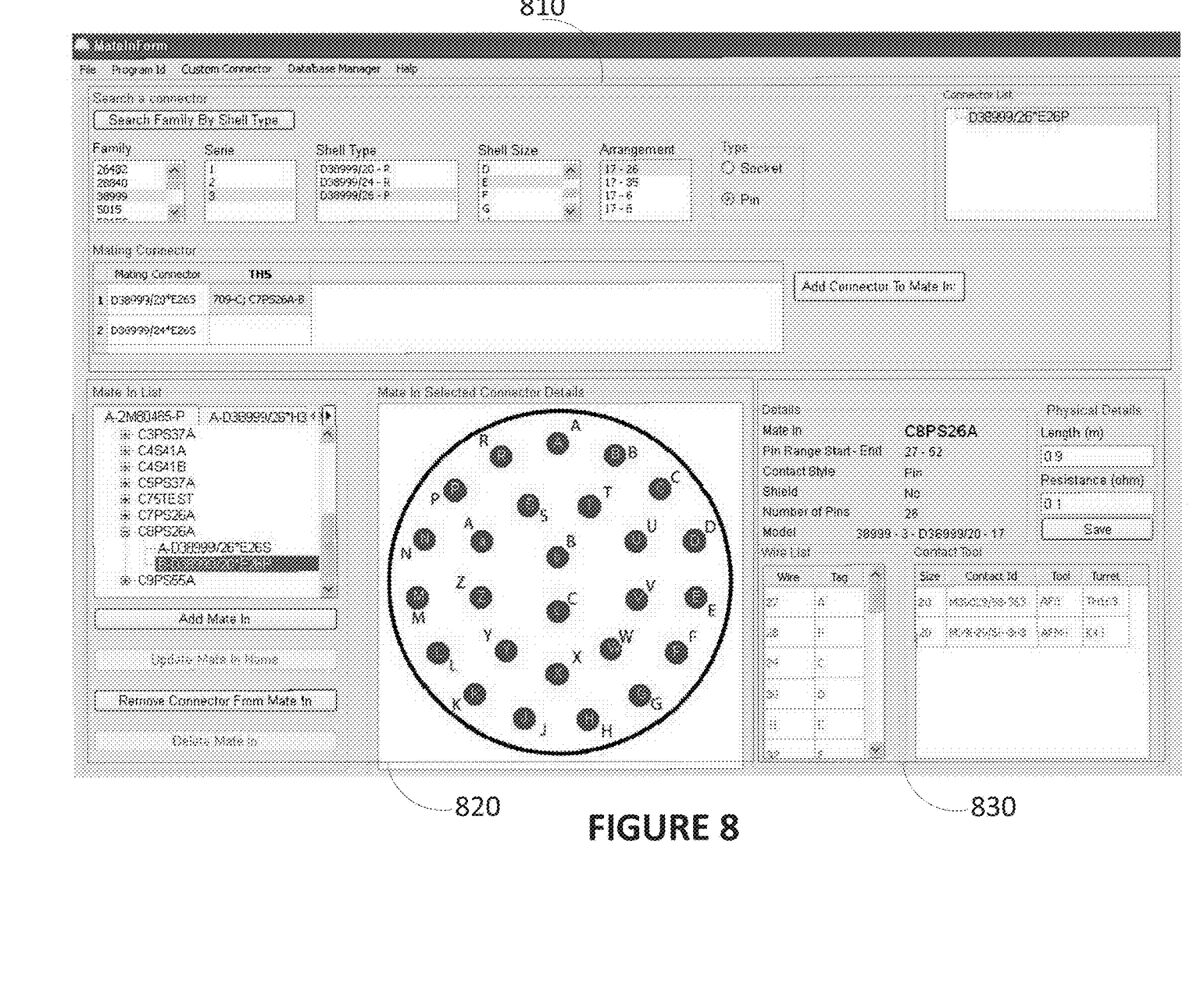
FIG. 8 is a screenshot illustrating an interface for adding a connector to a mate-in list, according to an embodiment.

While FIGS. 3 to 7 were directed to a part of equipment comprising a test program, FIG. 8 is directed to a part of equipment comprising a connector having contacts. FIG. 8 shows an interface for adding a connector to a mate-in list. Connector addition panel 810 allows the user to add a new connector to the test equipment. According to an embodiment, the user can choose a family, serie, shell type and size, arrangement and whether it is a pin or a socket. Connector positioning panel 820 allows the user to place the newly created connector at the right place in the layout. If necessary, the connector can be physically built in parallel in accordance with the steps described above. A detail box 830 provides details about the chosen connector.

Figure 9:
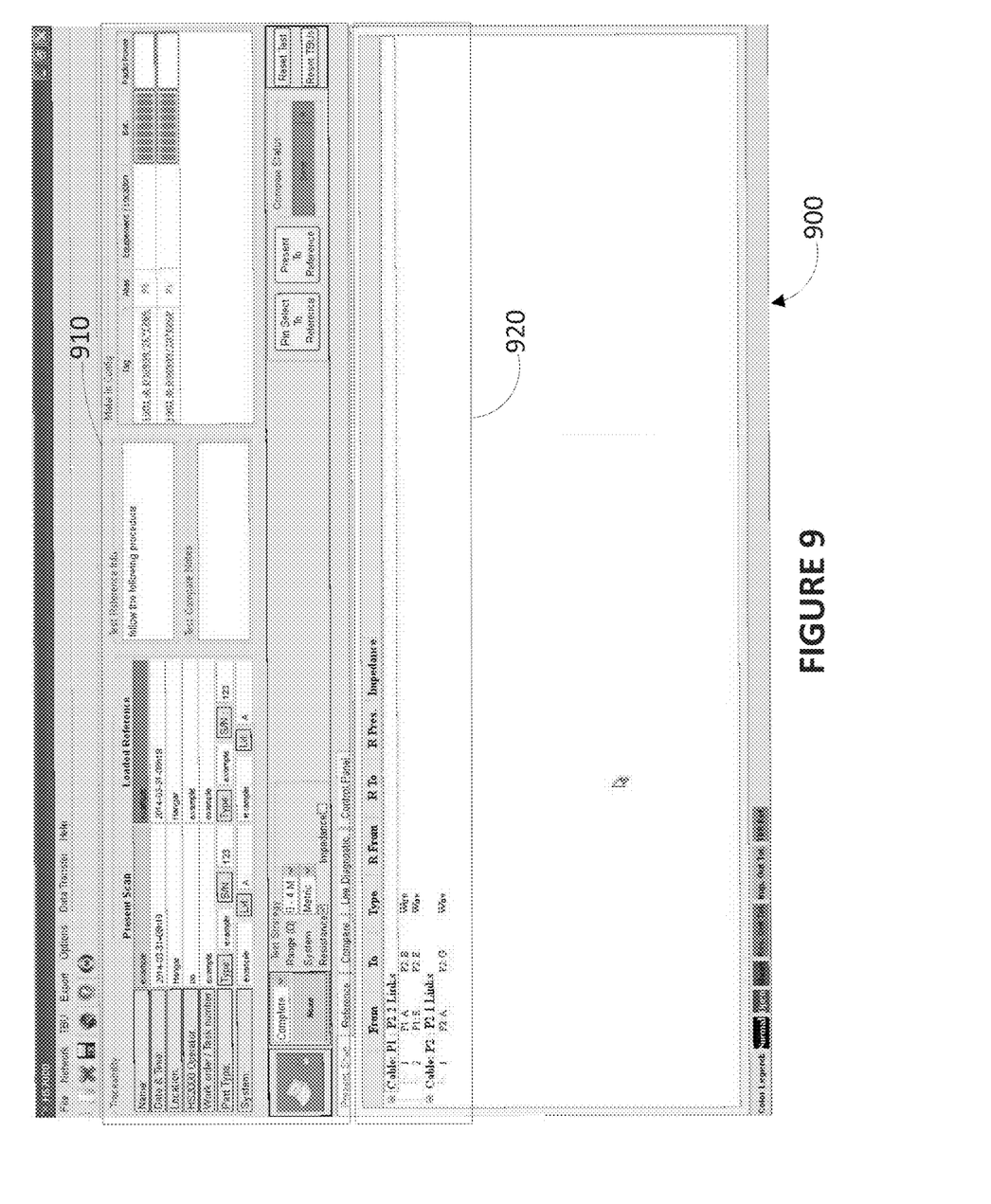
FIG. 9 is a screenshot illustrating a user interface for performing a test of electrical equipment, according to an embodiment.

FIG. 9 shows a user interface 900 for performing a test of electrical equipment such as scanning a wire harness. A test panel 910 shows the test specifications of the test being performed (name of the test, date & time, references used, state of the battery, state of the test, etc.). The results panel 920 shows the interconnection results, for example a list of connections between terminations, the impedance of the link between them, type of connector, and the like.

Figure 10A:
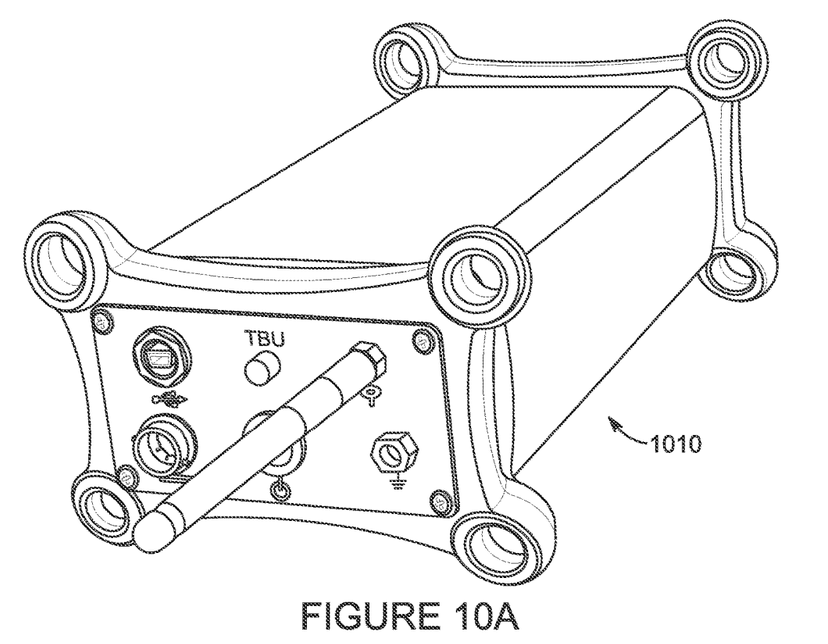
FIGS. 10A to 10C are pictures illustrating embodiments of testing equipment.
Figure 10B:
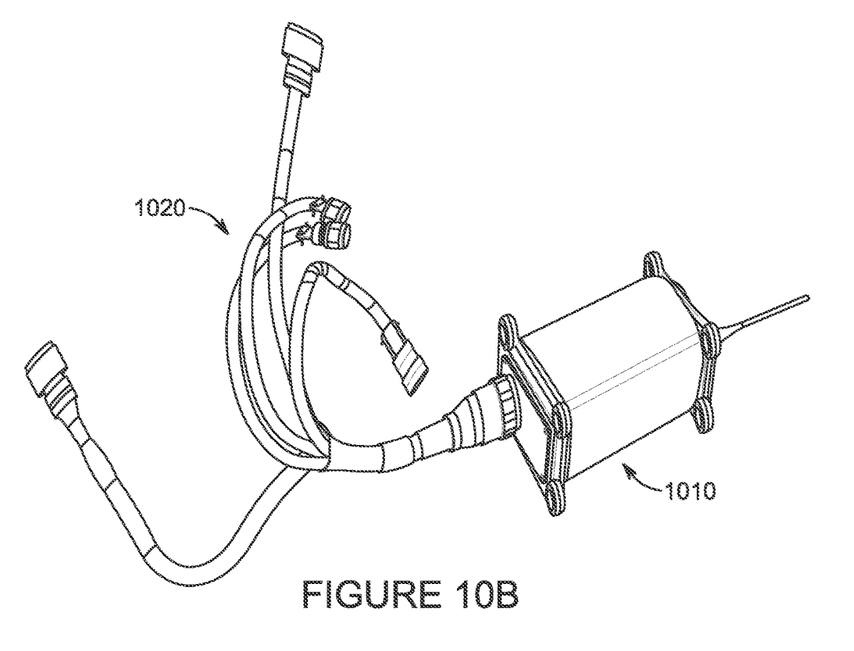
Figure 10C:
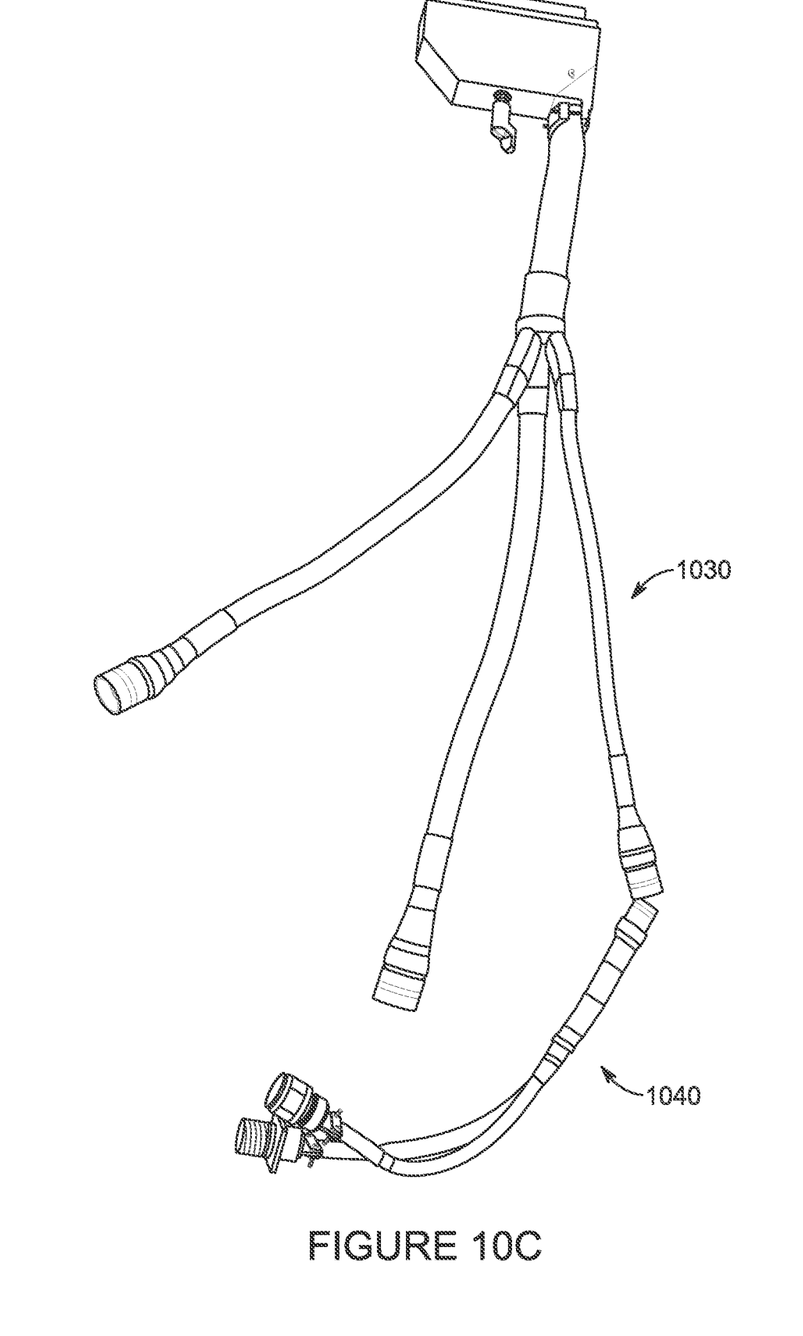

FIG. 10A shows a test box unit 1010 which is a part of automated testing equipment (ATE), according to an embodiment. FIG. 10B shows a test box unit 1010 having mating cables 1020 connected thereto. These cables 1020 are an example of cables that can have missing connectors at their end, thereby causing the necessity to manufacture a connector at least in part. FIG. 10C shows an interface having first-level mating cables 1030 and second-level mating cables 1040.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A method for building a mating assembly for use with a test equipment in performing a test of electrical equipment at a testing location, the mating assembly comprising wires, an ATE-side connector on a side toward the test equipment and a mating connector on a side toward the electrical equipment, the method comprising:

accessing a database comprising data about the ATE-side connector and the mating connector, the data being sufficient for selecting the ATE-side connector and the mating connector required for the test and allowing building the mating assembly; and in-situ building the mating assembly based on the data by assembling the wires, the selected ATE-side connector and the selected mating connector.

2. The method of claim 1, further comprising, prior to accessing a database, identifying all parts that are required for performing the test of electrical equipment.

3. The method of claim 2, further comprising identifying all parts that are not available for the test of electrical equipment.

4. The method of claim 1, wherein accessing a database comprises accessing, through a communication network, a centralized database which is remote from a location at which the testing is performed.

5. The method of claim 1, wherein accessing a database comprises performing a financial transaction to permit access to the data allowing building the part.

6. The method of claim 1, wherein building the mating assembly based on the data comprises building a connector shell using a 3D printer.

7. The method of claim 1, wherein building a mating assembly based on the data comprises building at least one of the ATE-side connector and the mating connector using a printed circuit board and standard contacts.

8. The method of claim 1, wherein building the mating assembly based on the data comprises obtaining existing parts and assembling them into an interface cable.

9. The method of claim 1, further comprising, prior to building the mating assembly, accessing an inventory management module for informing a user about the availability, at a given location, of existing parts for an interface cable.

10. The method of claim 1, wherein building the mating assembly using the data comprises determining an interface cable layout to perform the test in accordance with an actual configuration of the testing equipment.

11. The method of claim 10, further comprising generating a test program based on a graphical representation of the test equipment for using the built mating assembly in the test.

12. The method of claim 1, further comprising providing the mating assembly with a unique identifier.

13. The method of claim 12, further comprising, with the unique identifier, validating an identity of the part as usable in a regulated context.

14. The method of claim 12, further comprising saving the unique identifier in the database for a future use.

15. The method of claim 1, further comprising determining an availability of a standard ATE-side connector and a standard mating connector.

* * * * *